United States Patent
Hamada et al.

(10) Patent No.: US 9,818,183 B2
(45) Date of Patent: Nov. 14, 2017

(54) DISEASE DIAGNOSTIC APPARATUS, IMAGE PROCESSING METHOD IN THE SAME APPARATUS, AND MEDIUM STORING PROGRAM ASSOCIATED WITH THE SAME METHOD

(71) Applicant: CASIO COMPUTER CO., LTD., Shibuya-ku, Tokyo (JP)

(72) Inventors: Akira Hamada, Sagamihara (JP); Mitsuyasu Nakajima, Tokyo (JP); Masaru Tanaka, Tokyo (JP); Toshitsugu Sato, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/860,603

(22) Filed: Sep. 21, 2015

(65) Prior Publication Data
US 2016/0133010 A1 May 12, 2016

(30) Foreign Application Priority Data

Nov. 7, 2014 (JP) ................................. 2014-227527

(51) Int. Cl.
*G06K 9/00* (2006.01)
*G06K 9/40* (2006.01)
(Continued)

(52) U.S. Cl.
CPC .............. *G06T 7/0012* (2013.01); *G06T 7/11* (2017.01); *G06T 2207/10024* (2013.01);
(Continued)

(58) Field of Classification Search
None
See application file for complete search history.

(56) References Cited

U.S. PATENT DOCUMENTS 5,241,468 A * 8/1993 Kenet .................. A61B 5/0059
382/128
7,720,266 B2 * 5/2010 Ni ....................... G01S 7/52034
378/37
(Continued)

FOREIGN PATENT DOCUMENTS

JP 63173182 A 7/1988
JP 2005192944 A 7/2005
(Continued)

OTHER PUBLICATIONS

Fisher et al ("Analysis of skin lesions with pigmented networks", 1996).*
(Continued)

*Primary Examiner* — Avinash Yentrapati
(74) *Attorney, Agent, or Firm* — Holtz, Holtz & Volek PC (57) ABSTRACT

The invention provides a method of processing an image in a diagnostic apparatus 100 of diagnosing a disease using a captured image of an affected area, comprising: a separating step of separating the captured image into a brightness component and a color information component; and an extracting step of extracting a region to be diagnosed based on the brightness component or the color information component of the configured image to highlight likeness of the region.

3 Claims, 4 Drawing Sheets

(51) Int. Cl.
  *G06T 7/00* (2017.01)
  *G06T 7/11* (2017.01)
(52) U.S. Cl.
  CPC .............. *G06T 2207/10056* (2013.01); *G06T 2207/20028* (2013.01); *G06T 2207/30088* (2013.01); *G06T 2207/30096* (2013.01); *G06T 2207/30101* (2013.01)

(56) References Cited

U.S. PATENT DOCUMENTS

| | | | |
|---|---|---|---|
| 8,406,482 B1 | 3/2013 | Chien et al. | |
| 2003/0002736 A1* | 1/2003 | Maruoka | G06T 5/009 382/168 |
| 2004/0151356 A1* | 8/2004 | Li | G06K 9/527 382/131 |
| 2004/0190789 A1* | 9/2004 | Liu | G06T 5/009 382/274 |
| 2004/0212815 A1* | 10/2004 | Heeman | G06T 11/001 358/1.9 |
| 2005/0083347 A1* | 4/2005 | Wilensky | G06T 5/003 345/606 |
| 2006/0093213 A1* | 5/2006 | Steinberg | G06K 9/0061 382/167 |
| 2007/0237418 A1* | 10/2007 | Toyoda | G06T 5/008 382/260 |
| 2008/0080766 A1* | 4/2008 | Payonk | A45D 44/005 382/167 |
| 2008/0144962 A1 | 6/2008 | Jung et al. | |
| 2008/0260218 A1 | 10/2008 | Smith et al. | |
| 2008/0275315 A1* | 11/2008 | Oka | A61B 5/0059 600/306 |
| 2009/0034824 A1 | 2/2009 | Li et al. | |
| 2009/0161953 A1* | 6/2009 | Ciurea | H04N 1/4074 382/172 |
| 2010/0158330 A1* | 6/2010 | Guissin | G06K 9/00369 382/128 |
| 2010/0195901 A1* | 8/2010 | Andrus | H04N 5/213 382/162 |
| 2011/0096201 A1* | 4/2011 | Yoo | G06T 5/007 348/235 |
| 2012/0301024 A1* | 11/2012 | Yuan | H04N 1/624 382/167 |
| 2013/0279776 A1 | 10/2013 | Guissin et al. | |
| 2014/0285641 A1 | 9/2014 | Kato et al. | |
| 2015/0213619 A1* | 7/2015 | Nakamura | A61B 5/0077 382/128 |
| 2015/0339817 A1* | 11/2015 | Kuriyama | G06T 1/0007 348/71 |
| 2015/0379712 A1 | 12/2015 | Guissin et al. | |
| 2016/0014328 A1 | 1/2016 | Rokutanda | |
| 2016/0133009 A1 | 5/2016 | Hamada et al. | |
| 2016/0133011 A1 | 5/2016 | Nakajima | |

FOREIGN PATENT DOCUMENTS

| | | |
|---|---|---|
| WO | 2007031946 A2 | 3/2007 |
| WO | 2014027522 A1 | 2/2014 |
| WO | 2014057618 A1 | 4/2014 |
| WO | 2014119047 A1 | 8/2014 |
| WO | 2014155782 A1 | 10/2014 |
| WO | 2014172671 A1 | 10/2014 |

OTHER PUBLICATIONS

Extended European Search Report dated Apr. 26, 2016, issued in counterpart European Application No. 15186631.6.
U.S. Appl. No. 14/860,581; First Named Inventor: Akira Hamada; Title: "Disease Diagnostic Apparatus, Image Processing Method in the Same Apparatus, and Medium Storing Program Associated With the Same Method"; filed Sep. 21, 2015.
Fischer, "Analysis of Skin Lesions with Pigmented Networks", Proceedings of the international conference in image processing (ICIP) Lausanne, Sep. 16-19, 1996: vol. 1, Sep. 16, 1996, pp. 323-326, XP002381197.
Haiyan, et al., "An Integrated Bilateral and Unsharp Masking Filter for Image Contrast Enhancement", 2013 International Conference on Machine Learning and Cybernetics, IEEE, vol. 2, Jul. 14, 2013, pp. 907-912, XP032637586.
Koehler, et al., "Non-invasive imaging techniques in the diagnosis of skin diseases", Expert Opinion on Medical Diagnostics, Informa Healthcare, UK, vol. 5, No. 5, Sep. 1, 2011, pp. 425-440, XP009171403.
Shenton, et al., "Harvard Brain Atlas: a Teaching and Visualization Tool", Biomedical Visualization, Oct. 30, 1995. IEEE Computer Society, pp. 10-17, 81, XP010196687.
Yandow-Reilly, et al., "Unsupervised Skin Lesion Classification and Matching", RIT Scholar Works, Feb. 1, 2003, pp. 1-48, XP055261424.
Toshitsugu Sato, et al., "Improved Detection of Dermoscopic Structures by High Dynamic Range Image Conversion", Japanese Journal of Dermatology, vol. 123, No. 2, Feb. 2013, pp. 121-131.
Japanese Office Action (and English translation thereof) dated May 31, 2016, issued in counterpart Japanese Application No. 2014-227527.
U.S. Appl. No. 14/860,618; First Named Inventor: Mitsuyasu Nakajima; "Disease Diagnostic Apparatus, Image Processing Method in the Same Apparatus, and Medium Storing Program Associated With the Same Method"; filed Sep. 21, 2015.
Bovik, et al., "Handbook of Image and Video Processing", Jan. 1, 2000, AP, pp. 26-27 and 95-97, XP 002756272.
Cheng, et al., "Adaptive synthetic aperture radar image enhancement", SPIE—International Society for Optical Engineering. Proceedings, vol. 7494, Oct. 30, 2009 (Oct. 30, 2009), p. 749426.
European Communication pursuant to Article 94(3) EPC dated Apr. 26, 2017, issued in counterpart European Application No. 15186631.6.

\* cited by examiner

DISEASE DIAGNOSTIC APPARATUS, IMAGE PROCESSING METHOD IN THE SAME APPARATUS, AND MEDIUM STORING PROGRAM ASSOCIATED WITH THE SAME METHOD

CROSS-REFERENCE TO RELATED APPLICATIONS

This application claims priority from Japanese Patent Application No. 2014-227527 filed on Nov. 7, 2014, which is incorporated herein by reference.

TECHNICAL FIELD

The present invention relates to a disease diagnostic apparatus, an image processing method in the same apparatus, and a medium storing a program associated with the same method.

BACKGROUND ART

Generally, visual inspection is necessarily performed to diagnose a cutaneous legion, thereby obtaining an amount of information. However, not only discrimination between a mole and a spot but also discrimination between a benign tumor and a malignant tumor are substantially difficult with a naked eye inspection and even a magnifying glass inspection. For the reasons, dermoscopic inspection in which a dermoscope-equipped camera is used to capture an image of a disease has been conventionally performed.

The dermascope is a noninvasive diagnostic device in which a disease irradiated with light from, for example, a halogen lamp, and unobstructed by reflective light due to echo gel or a polarization filter is magnified (typically ×10) and subjected to observation. A dermoscopic diagnosis can be defined as the inspection of skin diseases with the dermoscope. For more detail, see internet URL (http://www.twmu.ac.jp/DNH/department/dermatology/dermoscopy.html) (accessed on Sep. 1, 2014). In accordance with the dermoscopic diagnosis, scattered reflection occurring due to a cuticle is eliminated, thereby rendering the distribution of pigmentation from an epidermis to a superficial intradermal layer increasingly visible.

For example, Patent Literature 1 (Japanese patent publication No. 2005-192944 (A)) discloses technologies of a remote diagnosis apparatus of diagnosing a pigmented skin disease employing a value such as color, a texture, an asymmetricity, and a circularity based on an image of a skin captured by the dermoscope. In accordance with Patent Literature 1, a portable phone provided with a dermoscope-equipped camera is used, and an image of a skin having a disease of a benign nevus pigmentosus and etc. and having a risk of a melanoma is captured by the dermoscope. The portable phone is connected to an internet due to its network connecting function, and the image of the skin captured is transmitted via the internet to the remote diagnosis apparatus to request a diagnosis. Upon receiving the image of the skin based on the request, the remote diagnosis apparatus uses a melanoma diagnosis program to determine whether based on the image of the skin the disease is a melanoma or not, or in a case where the disease is the melanoma, which stage of the melanoma is. The determination as a result is transmitted to a physician having requested the diagnosis.

While diagnosis that is performed based on the aforementioned dermoscopic image has become widely used, clear shape change or feature is often difficult to obtain. In addition, an observation of the image and a determination of a disease actually depend on a skill of a physician or clinician. For the reasons, a tool allowing for easy and accurate diagnosis based on image processing technologies of, for example, highlighting a disease portion in the dermoscopic image, has been desired.

CITATION LIST

Patent Literature

[Patent Literature 1] Japanese patent publication No. 2005-192944 (A)

SUMMARY OF INVENTION

In accordance with a first aspect of the invention, there is provided a method of processing an image in a diagnostic apparatus of diagnosing a disease using a captured image of an affected area, comprising: a separating step of separating the captured image into a brightness component and a color information component; and an extracting step of extracting a region to be diagnosed based on the brightness component or the color information component of the configured image to highlight likeness of the region.

In accordance with a second aspect of the invention, there is provided a diagnostic apparatus of diagnosing a disease using a captured image of an affected area, comprising: an image-memorizing unit configured to memorize the captured image; and a processing unit configured to process the captured image memorized in the image-memorizing unit, the processing unit comprising: a separating means configured to separate the captured image into a brightness component and a color information component, and an extracting means configured to extract a region to be diagnosed based on the brightness component or the color information component of the configured image to highlight likeness of the region.

In accordance with a third aspect of the invention, there is provided a non-transitory computer readable medium storing a program of processing an image in a diagnostic apparatus of diagnosing a disease using a captured image of an affected area, the program causing a computer to execute: a separating step of separating the captured image memorized into a brightness component and a color information component; and an extracting step of extracting a region to be diagnosed based on the brightness component or the color information component of the configured image to highlight likeness of the region.

DESCRIPTION OF EMBODIMENT

Referring to the accompanying drawings, Embodiment of the invention will be hereinafter described in detail. Fur-

Configuration of Embodiment

Figure 1:
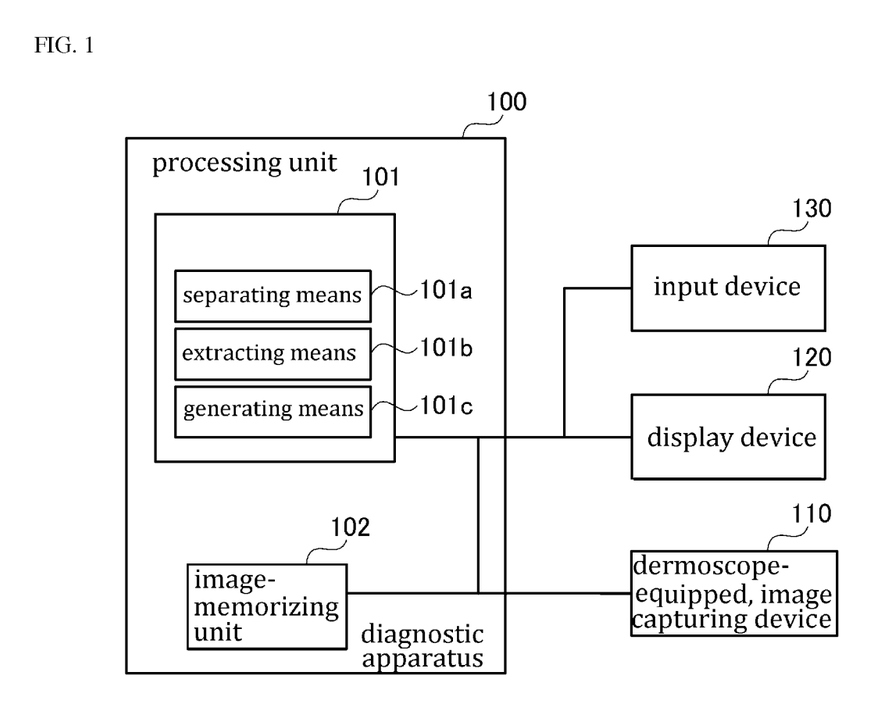
FIG. 1 is a block diagram showing a configuration of Embodiment of a diagnostic apparatus in accordance with the present invention.

FIG. 1 is a block diagram showing a configuration of a diagnostic apparatus 100 in accordance with Embodiment of the present invention. Referring to FIG. 1, an image-capturing device 110 equipped with a dermoscope, which can be hereinafter designated as an "image-capturing device 110" or "dermoscope-equipped, image-capturing device 110" throughout the specification, is connected to the diagnostic apparatus 100. The dermoscope-equipped, image-capturing device 110 is configured to capture an image of an affected area in accordance with an instruction from the diagnostic apparatus 100 (a processing unit 101), memorize the captured image (i.e., a dermoscopic image) in an image-memorizing unit 102, and display the captured image on a predetermined area of a display device 120. Furthermore, the captured image is highlighted by the processing unit 101, and then memorized in the image-memorizing unit 102 and displayed on the predetermined area of the display device 120. An input device 130 is configured to perform an instruction for starting to capture an image such as a dermoscopic image, and selection of a region in the dermoscopic image, which will be described below.

The display device 120 may be a LCD (Liquid Crystal Display) monitor, and the input device 130 may be a mouse.

The processing unit 101 is configured to process the captured image such as the dermoscopic image, of the affected area memorized in the image-memorizing unit 102. Referring to FIG. 1, the processing unit 101 has separating means 101a, extracting means 101b, and generating means 101c.

The separating means 101a function as means for separating the captured image into a brightness component and a color information component. The extracting means 101b function as means for extracting a region to be diagnosed such as a vessel-corresponding region based on the brightness component or the color information component of the captured image so as to highlight the likeness of the region.

The generating means 101c function as means for combining the extracted result of the region as mentioned previously with a background image to generate a reconstructed image. In this regard, the background image is selected by physician's operation with the input device 130, and is at least one selected from the group consisting of the captured image, a grayscale image of the captured image, a contrast-highlighted image of the captured image, and a brightness component-highlighted image that is obtained by separating a brightness component of the captured image into a base component (also called a large-scale component) and a detail component and performing highlighting process on the base component and the detail component in a different manner.

Each of the separating means 101a, the extracting means 101b, and the generating means 101c as described above can execute the afore-mentioned original function thereof by the processing unit 101's sequentially reading a program in accordance with Embodiment of the present invention, owned by the processing unit 101.

Operation of Embodiment

The operation of the diagnostic apparatus 100 in accordance with Embodiment of the present invention as shown in FIG. 1 is described in detail with the following operational examples with reference to FIG. 2 and below.

Figure 2:
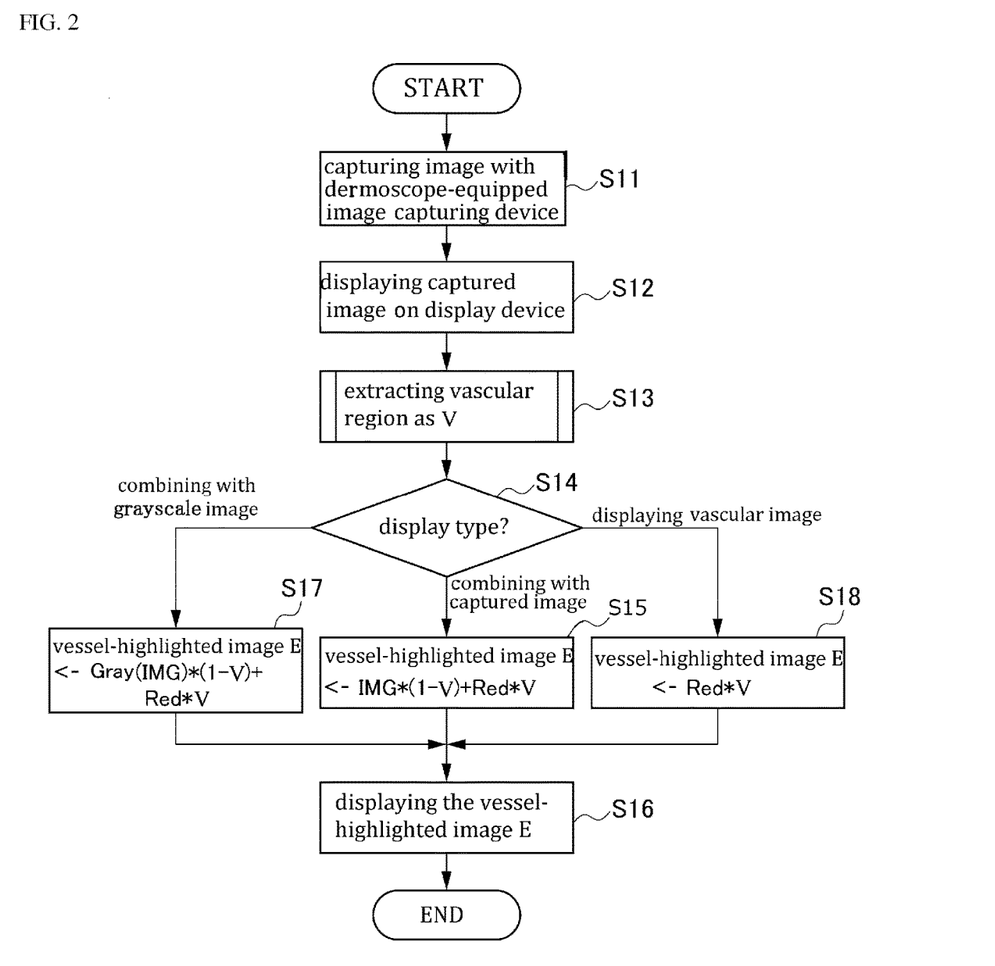
FIG. 2 is a flow chart illustrating a basic processing operation of Embodiment of the diagnostic apparatus.

FIG. 2 depicts the flow of basic processing operation of the diagnostic apparatus 100 in accordance with Embodiment of the present invention. Referring to FIG. 2, the processing unit 101 firstly acquires an image of an affected area (i.e., a skin legion) that is captured by the dermoscope-equipped, image-capturing device 110 (Step S11). Then, the captured image as acquired is memorized in the predetermined area of the image-memorizing unit 102, and is displayed on the display device 120 (Step S12).

Figure 4:
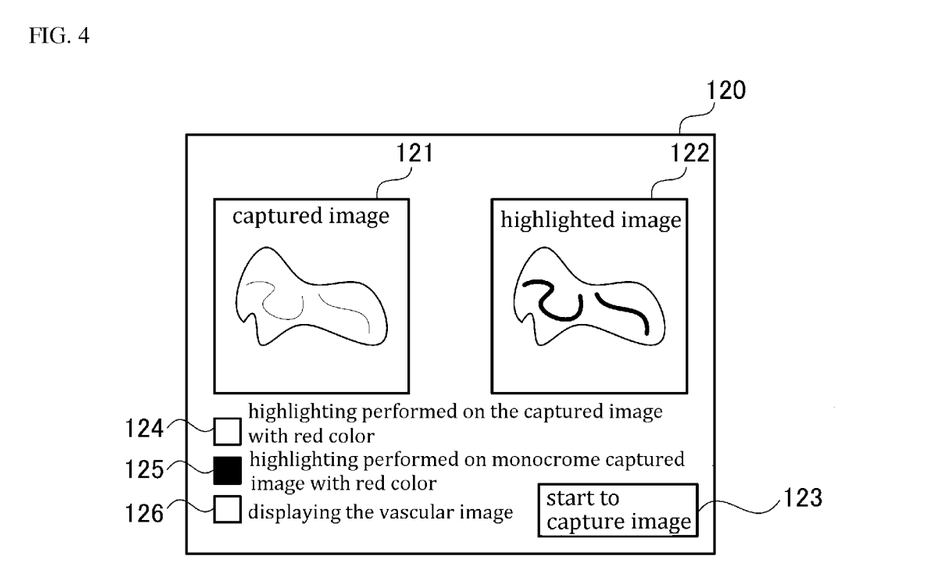
FIG. 4 is an exemplary display screen configuration of Embodiment of the diagnostic apparatus.

An exemplary image of a display screen displayed on the display device 120 is shown in FIG. 4. In the screen of FIG. 4, a captured image-displaying section 121 in which the captured image is displayed is arranged at a left side and a highlighted image-displaying section 122 in which the highlighted image such as the highlighted image of vessel is displayed is arranged at a right side. For example, upon the physician's clicking a button of "start to capture image" 123 which is located at a bottom right of the screen, the dermoscope-equipped, image-capturing device 110 can start to capture the image of the affected area, and the processing unit 101 can acquire the captured image and display the captured image in the captured image-displaying section 121 of the display device 120.

Furthermore, there are provided checkboxes 124, 125, and 126, which are located at a bottom left of the screen and provided for the designation of display type of the vessel region. When the physician wishes to display an image where highlighting is performed on the captured image with red color, an image where highlighting is performed on monochrome captured image with red color, or a vascular image, he or she does a selection operation (i.e., an operation of clicking) with the input device 130, thereby rendering the associated checkbox 124, 125, or 126 check-marked.

Returning to the flow chart of FIG. 2, after the processing unit 101 displays the captured image as acquired in the captured image-displaying section 121 of the display device 120, it extracts a vascular region as a likelihood V from the captured image (Step S13). In this regard, if the vascular region has two values, it has a value of 1 or 2. If the vascular region has multiple values, it has a value of from 0 to 1. In the above, "0" means a non-vascular region and "1" means the vascular region. The process of extracting the vascular region as the likelihood V is described below.

Next, the processing unit 101 acquires information regarding the display type designated by the physician from the state of the checkboxes 124, 125, and 126 displayed on the display screen of the display device 120. Once the physician's selecting any of the checkboxes 124, 125, and 126, the processing unit 101 highlights the vessel-corresponding region based on the selected display type and displays the highlighted image as thus obtained in the highlighted image-displaying section 122.

Specifically, when the checkbox 124 has been selected (Step S14: "combining with captured image"), the generating means 101c of the processing unit 101 generate the vessel-highlighted image E in which the vascular region is indicated by red color on the captured image IMG (Step S15). In this regard, the vessel-highlighted image E can be generated in accordance with the following mathematical formula: E=IMG.*(1−V)+Red*V. In the above mathematical formula, "IMG." represents the captured image; "Red" represents red color; "*" represents multiplication; and ".*" represents multiplication per an element. Subsequently, the processing unit 101 displays the generated, vessel-highlighted image E in the highlighted image-displaying section 122 together with and next to the captured image displayed in the captured image-displaying section 121 of the display device 120 (Step S16).

On the other hand, when the checkbox 125 has been selected (Step S14: "combining with grayscale image"), the generating means 101c of the processing unit 101 convert the captured image to the grayscale image, and then generate the vessel-highlighted image E in which the vascular region is indicated by red color (Step S17). In this regard, the vessel-highlighted image E can be generated in accordance with the following mathematical formula: E=Gray(IMG).*(1−V)+Red*V. In the above mathematical formula, "Gray ( )" represents conversion to the grayscale image. Subsequently, the processing unit 101 displays the generated, vessel-highlighted image E in the highlighted image-displaying section 122 together with and next to the captured image displayed in the captured image-displaying section 121 of the display device 120 (Step S16).

Furthermore, when the checkbox 126 has been selected (Step S14: "displaying vascular image"), the generating means 101c of the processing unit 101 generate the vessel-highlighted image in which the vascular portion is indicated by red color and the non-vascular portion is indicated by black color (Step S18). In this regard, the vessel-highlighted image E can be generated in accordance with the following mathematical formula: E=Red*V. While the vascular region is indicated by red color, the color is not limited to red color and can be thus arbitrarily selected. Subsequently, the processing unit 101 displays the generated, vessel-highlighted image E in the highlighted image-displaying section 122 together with and next to the captured image displayed in the captured image-displaying section 121 of the display device 120 (Step S16).

Figure 3:
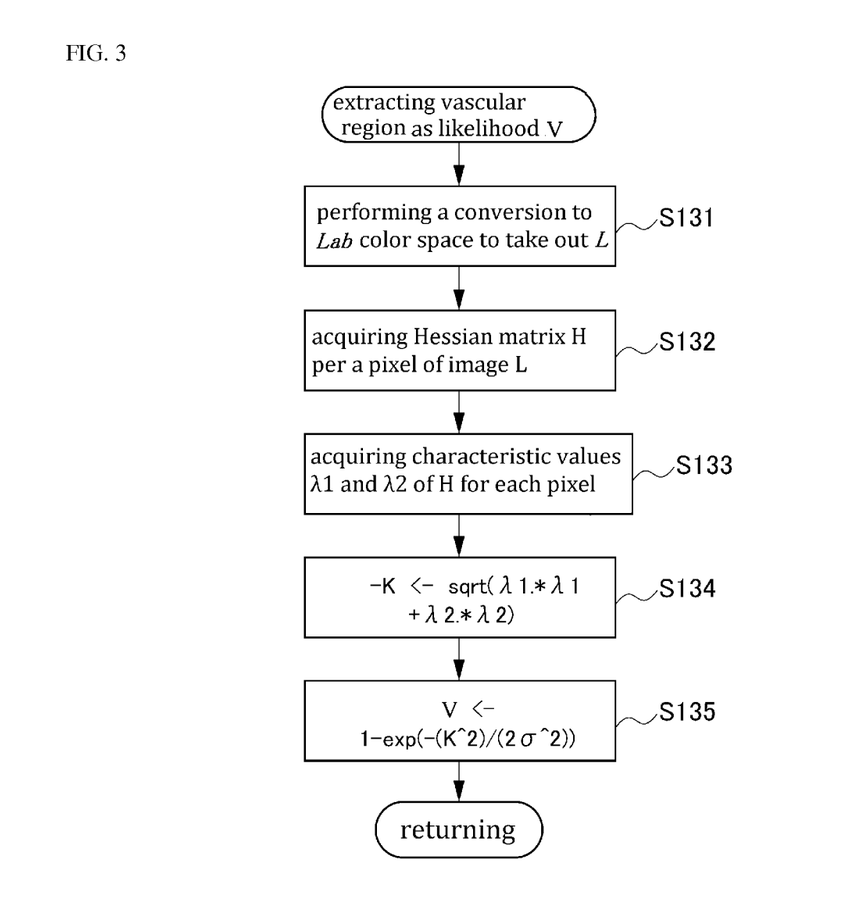
FIG. 3 is a flow chart illustrating the details of operation of extracting likeness of vessel.

The extracting process of the vascular region as the likelihood V as defined in Step S13 is described with reference to the flow chart of FIG. 3. Referring to FIG. 3, the separating means 101a of the processing unit 101 firstly convert the captured image from RGB color space to Lab color space (more exactly, CIE 1976 L*a*b* color space). The details of the Lab color space are described in, for example, internet URL (http://Ja.wikipedia.org/wiki/Lab%E8%89%B2%E7%A9%BA%E9%96%93) (accessed on Sep. 1, 2014).

Subsequently, the extracting means 101b of the processing unit 101 use image L (i.e., a brightness image) of the Lab color space that is acquired by the separating means 101a to acquire Hessian matrix H of the brightness image L on a pixel to pixel basis (Step S132). The Hessian matrix H has three elements of the second order derivative in x direction, the second order derivative in y direction, and the second order derivative in z direction for each pixel. When these elements are defined as Hxx, Hxy, and Hyy respectively, Hxx, Hxy, and Hyy can be represented by:

$$Hxx = s^2 * (Dxx ** L)$$

$$Hyy = s^2 * (Dyy ** L)$$

$$Hxy = s^2 * (Dxy ** L)$$

In the above formula, "*" represents convolution; and Dxx is the second order derivative of a Gaussian kenel in X direction, and can be obtained by the following mathematical formula:

$$Dxx = 1/(2*pi*\sigma^4) * ((X^2)/s^2 - 1) .* \exp(-(X^2+Y^2)/(2*s^2))$$

In the above mathematical formula, "s" represents a scale value depending on a size of vessel to be detected. If a vessel having a plurality of sizes is detected, a likelihood V of vessel as described below can be determined with respect to each size of the vessel and maximum likelihood V for each pixel can be selected. "pi" represents a circumference ratio; "X" and "Y" are locations within the kenel; ".*" represents multiplication per an element of the matrix; and ".^" represents power per an element.

Dyy is a second order derivative of a Gaussian kenel in Y direction, and is determined by the transposition of Dxx, as follows:

$$Dyy = Dxx'$$

In the above, "'" represents transposition.

Dxy is the first order derivative of Gaussian kenel in X direction and Y direction, and is determined in accordance with the following mathematical formula:

$$Dxy = 1/(2*pi*\sigma^6) * (Y*Y) .* \exp(-(X^2+Y^2)/(2*s^2))$$

The Hessian matrix H is represented, as follows:

$$H = [Hxx\ Hxy; Hxy\ Hyy]$$

Next, the extracting means 101b acquire characteristic values λ1 and λ2 of the Hessian matrix H per a pixel (Step S133). Since the Hessian matrix H is a real symmetric matrix, the characteristic values λ1 and λ2 should be real numbers. The characteristic values λ1 and λ2 can be obtained by the following mathematical formula:

$$\lambda 1 = 0.5 * (Dxx + Dyy + tmp)$$

$$\lambda 2 = 0.5 * (Dxx; Dyy - tmp)$$

In the above mathematical formula, tmp is defined as follows:

$$tmp = \mathrm{sqrt}(Dxx - Dyy) .* (Dxx - Dyy) + 4 * Dxy .* Dxy)$$

The extracting means 101b extract the vascular region as the likelihood V from the characteristic values λ1 and λ2 of each pixel acquired in Step S133, based on the following mathematical formula:

$$V = 1 - \exp((K^2)/2*\sigma^2))$$

In the above mathematical formula, K is defined, as follows:

$$K = \mathrm{sqrt}(\lambda 1 .* \lambda 1 + \lambda 2 .* \lambda 2),$$

which is also shown in Step S134. In the above formula, "σ" is an adjustment coefficient, and "sqrt ( )" means a square root of each element.

If the vascular region is represented by two values, the processing unit 101 can perform binarization using a threshold of th1. In other words, the binarization can be performed, as follows:

$$V = 0 \text{ if } V < th1$$

$$V = 1 \text{ else}$$

Effect of Embodiment

As described above, in accordance with the diagnostic apparatus 100 directed to Embodiment of the present invention, the processing unit 101 is performed such that the separating means 101a separate the captured image into the brightness component and the color information component; the extracting means 101b extract the region to be diagnosed such as the vessel-corresponding region using the brightness component or the color information component of the captured image in order to highlight the likeness of the region;

and the extracted result is displayed on the display device 120. For the reasons, the physician can visually check the screen in which the region to be diagnosed is highlighted, thereby allowing him or her to easily and correctly make a diagnosis. Therefore, diagnostic accuracy can be improved.

In accordance with the diagnostic device 100 directed to Embodiment of the present invention, the processing unit 101 displays the reconstructed image on the display device 120. The reconstructed image is generated by the generating means 101c via the processing of combining the extracted result of the region with the background image. The physician is provided with a user interface (UI) to select the background image from the group consisting of (1) the captured image, (2) the grayscale image of the captured image, (3) the contrast-highlighted image of the captured image, and (4) the brightness component-highlighted image that is obtained by separating the brightness component of the captured image into the base component and the detail component and performing highlighting process on the base component and the detail component in a different manner. For the reasons, the physician can dynamically select the display type depending on his/her objective of diagnosis, thereby allowing him or her to even more easily and correctly make a diagnosis. Accordingly, diagnosis accuracy can be further improved.

Furthermore, if the brightness component-highlighted image that is obtained by separating a brightness component of the captured image into the base component and the detail component and performing highlighting process on the base component and the detail component in a different manner is selected, the separating means 101a perform edge preserving filtering process on the image L corresponding to the brightness in the Lab color space so as to separate the base component and the detail component from each other. In this regard, a bilateral filter may be used as the edge preserving filter. The edge preserving filter which can be used in this step may be a bilateral filter. The detail of the bilateral filter is described in, for example, internet URL (http://en.wikipedia.org/wiki/Bilateral filter (accessed on Sep. 1, 2014).

While in Embodiment the captured image is converted from the RGB color space to the Lab color space and then processed, the captured image may be converted from the RGB color space to a HSV (Hue, Saturation, Lightness) color space and then processed. In this case, V component corresponds to the brightness component, and the HS component corresponds to the color information component. The HSV color space is a color space consisting of three components, that is, the HSV color space has hue, saturation (chroma), and value (lightness or brightness). The HSV color space can be also called as HSL (Hue, Saturation, Lightness) color space or HSB (Hue, Saturation, Brightness) color space.

The above Embodiment is given to illustrate the scope and spirit of the instant invention. This Embodiment will make apparent, to those skilled in the art, other embodiments and examples. These other embodiments and examples are within the contemplation of the present invention. Therefore, the instant invention should be limited only by the appended claims.

100 . . . diagnostic apparatus; 101 . . . processing unit; 101a . . . separating means; 101b . . . extracting means; 101c . . . generating means; 110 . . . dermoscope-equipped, image-capturing device; 120 . . . display device; 121 . . . captured image-displaying section; 122 . . . highlight image-displaying section; 123 . . . button of "start to capture image"; 124, 125, 126 . . . checkbox; 130 . . . input device

The invention claimed is:

1. A method of processing an image in a diagnostic apparatus for diagnosing a disease using a captured image of an affected area, the method comprising:

separating the captured image into a brightness component and a color information component; and extracting a region to be diagnosed based on the brightness component or the color information component of the captured image to highlight a likeness of the region, wherein in the extracting, a vascular region is extracted as a likelihood V from the captured image converted to a Lab color space, wherein the likelihood V is defined as:

$$V=1-\exp((K^2)/2*\sigma^2))$$

where K is defined as:

$$K=\text{sqrt}(\lambda 1.*\lambda 1+\lambda 2.*\lambda 2),$$

σ is an adjustment coefficient; sqrt ( ) means a square root of each element; and λ1 and λ2 are real numbers indicating characteristic values of Hessian matrix for each pixel.

2. The method according to claim 1, wherein the likelihood V indicates likeness of a vessel.

3. The method according to claim 2, wherein in the extracting, if a vessel having a plurality of sizes is detected, the likelihood V is determined by the adjustment coefficient σ corresponding to a size of the vessel, and a maximum V is selected per pixel.

* * * * *

UNITED STATES PATENT AND TRADEMARK OFFICE
CERTIFICATE OF CORRECTION

PATENT NO. : 9,818,183 B2  
APPLICATION NO. : 14/860603  
DATED : November 14, 2017  
INVENTOR(S) : Akira Hamada et al.

Page 1 of 1

It is certified that error appears in the above-identified patent and that said Letters Patent is hereby corrected as shown below:

In the Claims

Column 8, Line 32, Claim 1, delete "$V = 1-\exp((K.^2)/2*\sigma^2))$" and insert --$V = 1-\exp((K.^2)/(2*\sigma^2))$--.

Signed and Sealed this  
Sixth Day of March, 2018

Andrei Iancu  
*Director of the United States Patent and Trademark Office*